United States Patent [19]

Imaeda et al.

[11] Patent Number: 5,456,117

[45] Date of Patent: Oct. 10, 1995

[54] PRESSURE SENSOR APPARATUS AND METHOD OF MANUFACTURING WHEREIN THE SILICON-CRYSTAL SUBSTRATE OF THE SENSOR HAS INCLINED CRYSTALLOGRAPHIC AXES AND GAGE RESISTORS FORMED IN A CAVITY OF THE SUBSTRATE

[75] Inventors: Yasuo Imaeda; Shigekazu Yasuda; Hitoshi Iwata, all of Niwa, Japan

[73] Assignee: Kabushiki Kaisha Tokai-Rika-Denki-Seisakusho, Aichi, Japan

[21] Appl. No.: 229,024

[22] Filed: Apr. 18, 1994

[30] Foreign Application Priority Data

Apr. 21, 1993 [JP] Japan .................. 5-094563

[51] Int. Cl.⁶ .................. G01L 9/06
[52] U.S. Cl. .................. 73/727; 257/418
[58] Field of Search .................. 73/718, 721, 724, 73/727, 517 R, 559; 257/417, 418, 618, 619; 156/647, 657; 338/2, 4, 47; 204/129.35, 129.65

[56] References Cited

U.S. PATENT DOCUMENTS

| 4,320,664 | 3/1982 | Rehn et al. | 73/708 |
| 4,529,621 | 7/1985 | Ballard | 427/95 |
| 4,966,663 | 10/1990 | Mauger | 204/129.3 |
| 5,285,097 | 2/1994 | Hirai | 257/417 |

FOREIGN PATENT DOCUMENTS

| 56-126846 | 9/1981 | Japan . |
| 2-251142 | 10/1990 | Japan . |
| 2-290081 | 11/1990 | Japan . |

*Primary Examiner*—Richard E. Chilcot, Jr.
*Assistant Examiner*—William L. Oen
*Attorney, Agent, or Firm*—Oliff & Berridge

[57] ABSTRACT

A semiconductor silicon single-crystal substrate is used in which the crystallographic axes are inclined by a predetermined angle with respect to a normal to a thicknesswise face of the semiconductor silicon single-crystal substrate. A conductive-type epitaxial layer is grown on this semiconductor silicon single-crystal substrate to a predetermined thickness such that the direction of the crystallographic axes of the conductive-type epitaxial layer coincides with the direction of the crystallographic axes of the semiconductor silicon single-crystal substrate. Accordingly, since side surfaces of a cavity portion provided in the semiconductor silicon single-crystal substrate by the etching of the substrate, i.e., side walls of the semiconductor silicon single-crystal substrate provided respectively in the longitudinal direction of a diaphragm, are each formed at an angle of 90° with respect to the thicknesswise lower surface of the conductive-type epitaxial layer. Accordingly, an ultra-compact pressure sensor is formed in which the dimensional accuracy of the diaphragm is high. In addition, when etching is performed, etching stops at the epitaxial layer. Namely, since the epitaxial layer acts as an etching stopper, the dimensional accuracy in the thickness of the diaphragm is excellent over an entire wafer region for forming the substrate, and the yield in the wafer state improves remarkably.

20 Claims, 3 Drawing Sheets

PRESSURE SENSOR APPARATUS AND METHOD OF MANUFACTURING WHEREIN THE SILICON-CRYSTAL SUBSTRATE OF THE SENSOR HAS INCLINED CRYSTALLOGRAPHIC AXES AND GAGE RESISTORS FORMED IN A CAVITY OF THE SUBSTRATE

BACKGROUND OF THE INVENTION

1. Field of the Invention

The present invention relates to a pressure sensor for use in such as hydraulic control and measurement of intake pressure and exhaust pressure in automobiles and a method of manufacturing the same. More particularly, the present invention concerns a diaphragm for a pressure sensor using a semiconductor which excels in processing accuracy and can be made ultra-compact and a method of manufacturing a diaphragm for a pressure sensor in which the diaphragm thickness is uniform and the yield is excellent.

2. Description of the Related Art

Semiconductor pressure sensors are used in a wide range of fields since they are compact and excellent in accuracy. Conventional diaphragms for pressure sensors are formed by subjecting silicon substrates to chemical etching, e.g., electrochemical etching. In the case of a compact pressure sensor using a diaphragm formed of a silicon single crystal, a silicon single-crystal substrate is etched by setting {110} faces as crystal faces and a <211> direction as the longitudinal direction of the diaphragm so as to form the diaphragm. However, the operating efficiency involved in manufacturing this pressure sensor has been poor since the measurement of the thickness of the diaphragm and etching are repeated a number of times in order to improve the accuracy of the diaphragm thickness.

FIG. 3 is a schematic cross-sectional view illustrating a conventional pressure sensor.

The crystal faces of a silicon substrate 32 are set at {110} faces. A cavity 34 is formed in the silicon substrate 32 by means of etching, and a diaphragm 36 of a silicon single crystal is thereby obtained. The etching process is controlled in such a manner that those side walls of the cavity 34 that are respectively arranged along the longitudinal direction of the diaphragm 36 constitute {111} faces. However, since etching and the measurement of the diaphragm thickness are repeated to control the thickness of the diaphragm 36, the operation is complicated, and the yield of wafers has been poor due to the roughness of the etched surface of the diaphragm 36. Furthermore, it has been difficult to improve the processing accuracy of the diaphragm thickness owing to variations in the uniformity of the thickness of the silicon wafer prior to processing as well as during etching.

SUMMARY OF THE INVENTION

Accordingly, in view of the above-described problems, an object of the present invention is to provide a pressure sensor which can be made ultra-compact, and in which processing accuracy in the thickness of a diaphragm is excellent, an etched surface is free of roughness, and the yield in the wafer state is excellent.

Another object of the present invention is to provide a method of manufacturing a pressure sensor in which the thickness of a diaphragm for the pressure sensor is uniform with excellent processing accuracy, and in which the yield is excellent.

In accordance with a first aspect of the present invention, there is provided a pressure sensor comprising: a semiconductor silicon single-crystal substrate which has a fixed thickness and whose crystallographic axes are inclined by a predetermined angle with respect to a normal to a thicknesswise face of the semiconductor silicon single-crystal substrate; a conductive-type epitaxial layer which is of a conductivity type opposite to that of the semiconductor silicon single-crystal substrate and is grown on the semiconductor silicon single-crystal substrate to a predetermined thickness such that a direction of a crystallographic axes of the conductive-type epitaxial layer coincides with a direction of the crystallographic axes of the semiconductor silicon single-crystal substrate; and gage resistors formed by means of diffusion treatment on a first surface of the conductive-type epitaxial layer opposite to a second surface thereof abutting the semiconductor silicon single-crystal substrate, wherein the semiconductor silicon single-crystal substrate is formed with a portion thereof being removed by etching to form a cavity, the portion corresponding to that planar range of the conductive-type epitaxial layer that includes a portion where the gage resistors are formed.

In accordance with the above-described first aspect of the present invention, a semiconductor silicon single-crystal substrate is used in which the crystallographic axes are inclined by a predetermined angle with respect to a normal to a thicknesswise face of the semiconductor silicon single-crystal substrate. A conductive-type epitaxial layer is grown on this semiconductor silicon single-crystal substrate to a predetermined thickness such that the direction of the crystallographic axes of the conductive-type epitaxial layer coincides with the direction of the crystallographic axes of the semiconductor silicon single-crystal substrate. Accordingly, since side surfaces of a cavity portion provided in the semiconductor silicon single-crystal substrate by the etching of the silicon substrate, i.e., side walls of the semiconductor silicon single-crystal substrate provided respectively in the longitudinal direction of a diaphragm, are each formed at an angle of 90° with respect to the thicknesswise lower surface of the conductive-type epitaxial layer. Accordingly, it is possible to form an ultra-compact pressure sensor in which the dimensional accuracy of the diaphragm is high. In addition, when etching is performed, etching stops at the epitaxial layer. Namely, since the epitaxial layer acts as an etching stopper, the dimensional accuracy in the thickness of the diaphragm is excellent over an entire wafer region for forming the substrate, and the yield in the wafer state improves remarkably.

In accordance with a second aspect of the present invention, there is provided a method of manufacturing a pressure sensor, comprising the steps of: inclining a semiconductor silicon single-crystal substrate which has a fixed thickness and whose crystallographic axes are inclined by a predetermined angle with respect to a normal to a thicknesswise face of the semiconductor silicon single-crystal substrate, the semiconductor silicon single-crystal substrate being inclined by the predetermined angle in such a manner as to cause that crystallographic axes to coincide with a normal axis thereof; growing on a surface of the semiconductor silicon single-crystal substrate a conductive-type epitaxial layer of a conductivity type opposite to that of the semiconductor silicon single-crystal substrate to a predetermined thickness in a state in which the semiconductor silicon single-crystal substrate is inclined by the predetermined angle; forming gage resistors by means of diffusion treatment on a first surface of the conductive-type epitaxial layer opposite to a second surface thereof abutting the semiconductor silicon single-crystal substrate; and removing as an etching step a portion of the semiconductor silicon single-crystal substrate by etching to form a cavity, the portion corresponding to that planar range of the conductive-type epitaxial layer that includes a portion where the gage resistors are formed.

In accordance with the above-described second aspect of the present invention, a semiconductor silicon single-crystal substrate whose crystallographic axes are inclined by a predetermined angle with respect to a normal to a thicknesswise face of the semiconductor silicon single-crystal substrate is inclined by the predetermined angle, and is held in such a manner as to cause that crystallographic axes to coincide with a normal axis thereof. A conductive-type epitaxial layer of a conductivity type opposite to that of the semiconductor silicon single-crystal substrate is grown on a surface of the semiconductor silicon single-crystal substrate to a desired thickness. After the gage resistors are formed, the silicon substrate is subjected to etching. At this time, since the conductive-type epitaxial layer acts as an etching stopper, a pressure sensor having excellent dimensional accuracy can be obtained by one etching, and the operating efficiency and the yield improve remarkably.

In accordance with the pressure sensor of the present invention, outstanding advantages are obtained in that the pressure sensor can be made ultra-compact, processing accuracy in the diaphragm thickness is excellent, the etched surface is free of roughness, and the yield in the wafer state is excellent. Furthermore, in accordance with the method of manufacturing a pressure sensor, the thickness of the diaphragm for the pressure sensor can be made uniform with excellent processing accuracy, the yield can be improved, and the pressure sensor can be obtained in a simple process.

The above and other objects, features and advantages of the present invention will become more apparent from the following detailed description of the invention when read in conjunction with the accompanying drawings.

DESCRIPTION OF THE PREFERRED EMBODIMENT

Referring now to the accompanying drawings, a more detailed description will be given of the present invention.

Figure 1:
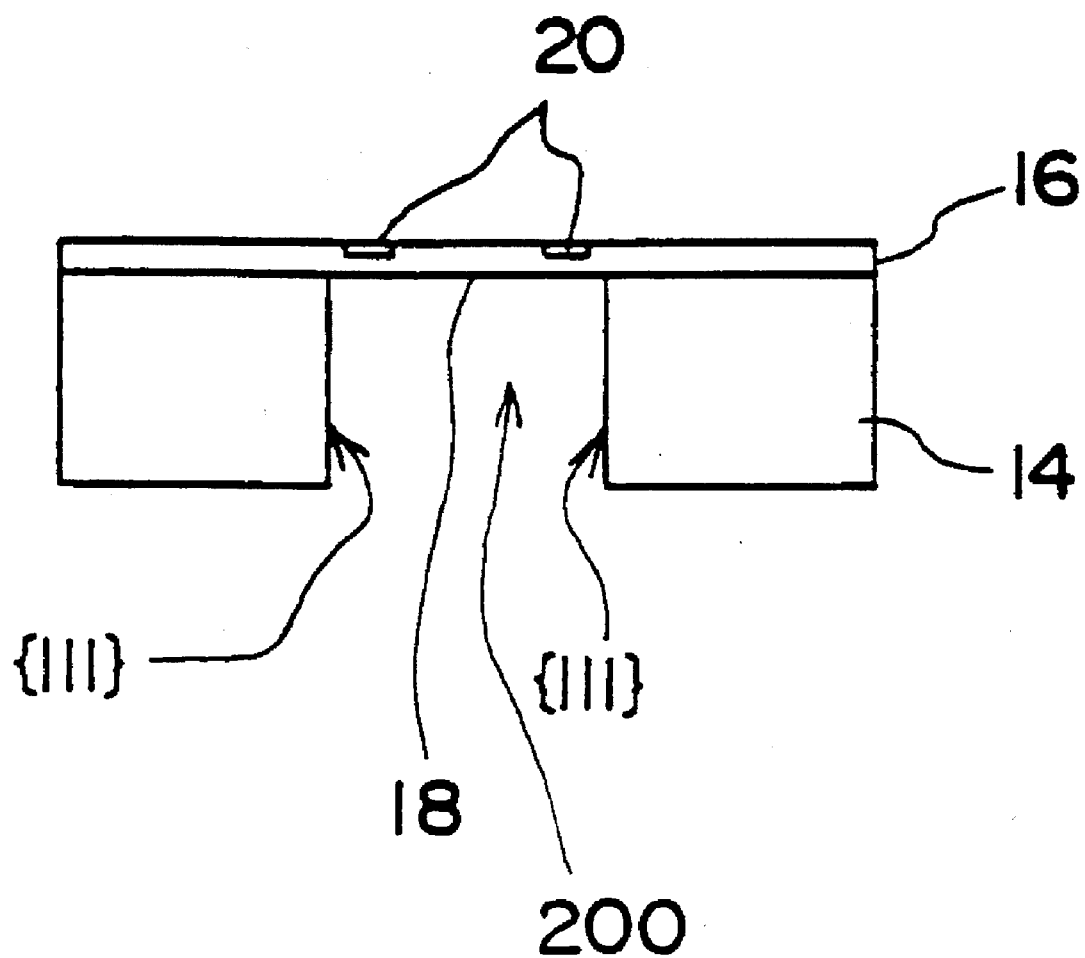
FIG. 1 is a schematic cross-sectional view of a pressure sensor in accordance with an embodiment of the present invention.
Figure 2A:
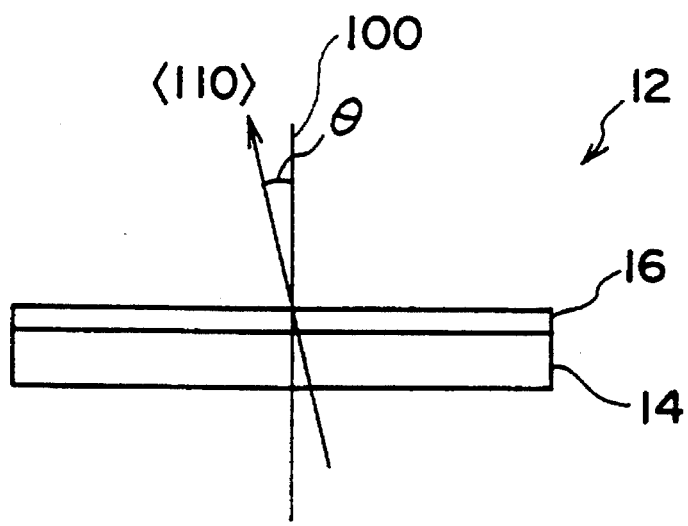
FIG. 2A is a schematic cross-sectional view of a wafer for the pressure sensor, illustrating an example of specifications in accordance with the present invention.
Figure 2B:
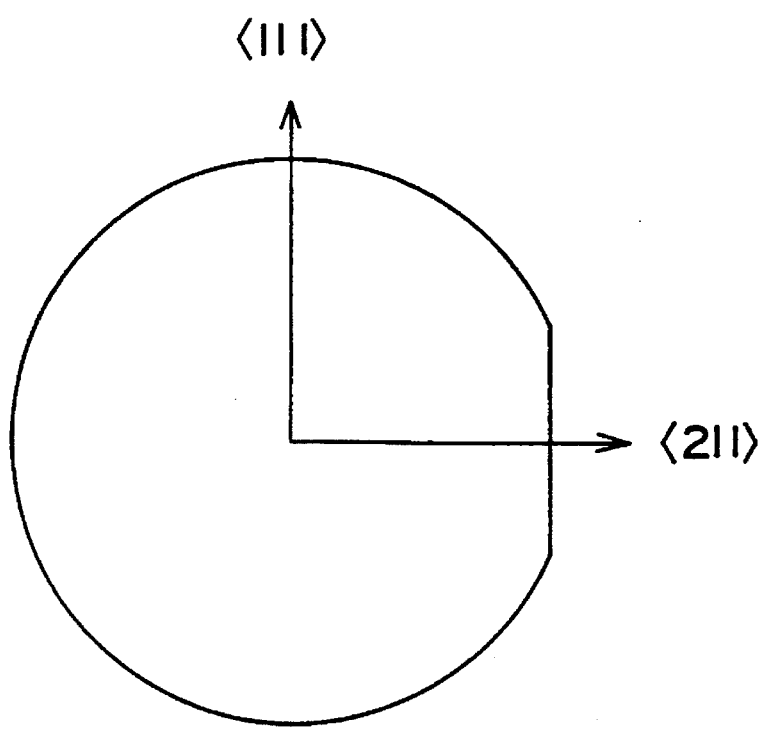
FIG. 2B is a schematic plan view of the wafer shown in FIG. 2A.
Figure 3:
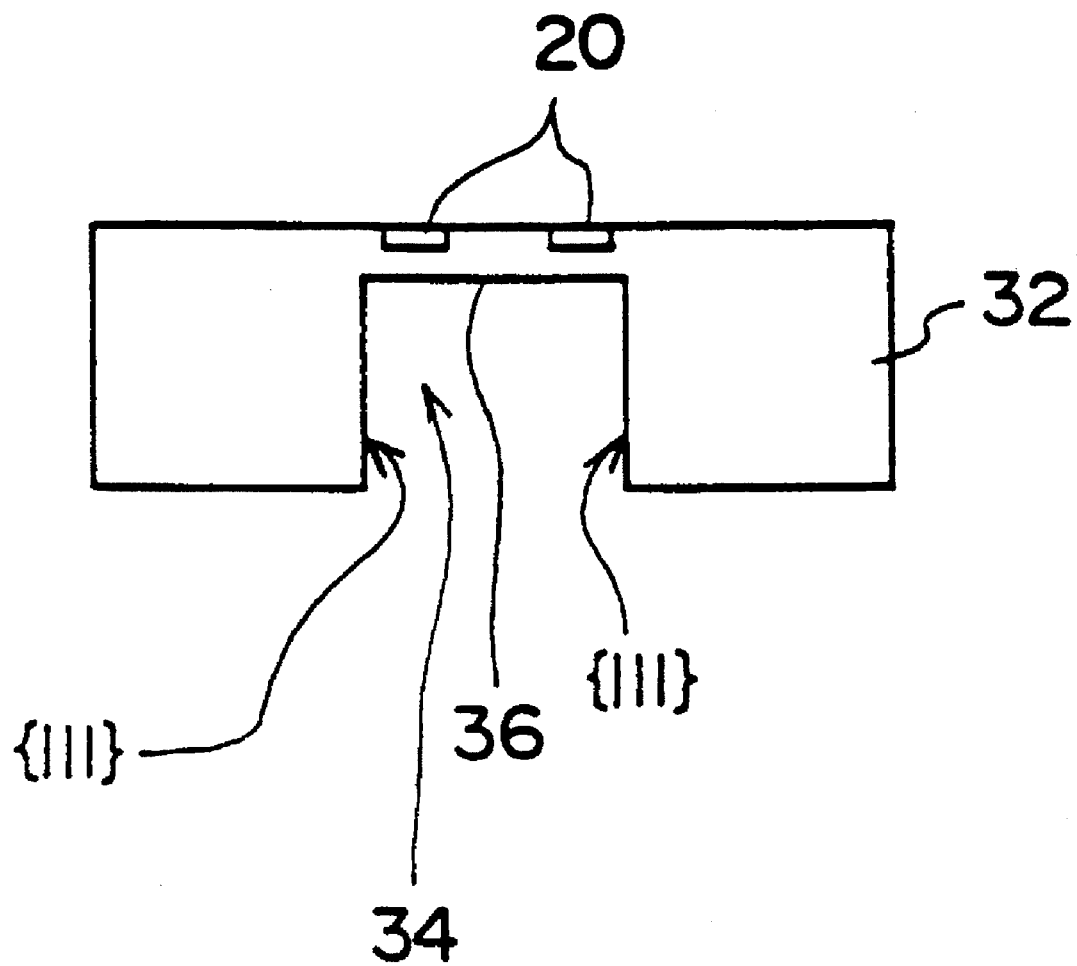
FIG. 3 is a schematic cross-sectional view of a conventional pressure sensor.

FIG. 1 is a schematic cross-sectional view illustrating a pressure sensor in accordance with an embodiment of the present invention. FIGS. 2A and 2B are a schematic cross-sectional view and a plan view, respectively, of a wafer for the pressure sensor, illustrating one example of specifications in accordance with the present invention.

A wafer 12 shown in FIGS. 2A and 2B uses a p-type silicon substrate 14 whose crystallographic axes are <110> axes, the crystal face of the p-type silicon substrate 14 is inclined 3° about an <111> axes to cause that crystallographic axes to coincide with an normal axis 100. Subsequently, an n-type epitaxial layer 16 which is of a conductivity type opposite to that of the p-type silicon substrate 14 is formed on the silicon substrate 14 in a state in which the silicon substrate 14 is inclined. The inclination θ of the crystallographic axes of the silicon substrate are preferably within the range of 1° to 5°. If the inclination is not more than 1°, a uniform epitaxial layer is not formed, whereas if it exceeds 5°, the etched configuration of the diaphragm deteriorates, so that the range outside the aforementioned range is not desirable. In particular, in a case where the p-type silicon substrate 14 in which the crystallographic axes are the <110> axes as in this embodiment, the epitaxial layer is not formed unless the crystal face is inclined. As for the formation of the n-type epitaxial layer 16, vapor-phase epitaxy is preferable if the compatibility with the silicon substrate and the accuracy of the film thickness are taken into consideration. In addition, the thickness of the n-type epitaxial layer 16 (i.e., the thickness of a diaphragm 18 which is formed afterwards) is arbitrarily selected depending on an object to be measured by the pressure sensor which is used.

The n-type epitaxial layer 16 of the silicon wafer 12 is subjected to predetermined diffusion treatment to form gage resistors, i.e., diffusion gages 20. Then, a portion of the silicon substrate 14 corresponding to that portion of a surface of the n-type epitaxial layer 16 which is opposite to the portion of the surface thereof where the diffusion gages 20 are provided is removed by etching to form a cavity 200, thereby forming the diaphragm 18. As an etching method, it is possible to use an arbitrary one insofar as it is anisotropic etching, and it is possible to cite, for instance, wet etching, plasma etching, and ion beam etching, but wet etching or the like, which is electrochemical etching, is generally used. As a wet etching method, it is possible to cite a method wherein an HF-HNO$_3$ solution or a KOH solution is used as an etching bath, the specimen and electrodes are placed in the solution, and an appropriate voltage is applied to the specimen. In a case where a KOH etching solution is used, in the specimen having a pn junction as in the present invention, it is possible to etch only the p-type silicon layer and leave the n-type silicon applied to the specimen.

Accordingly, as for the pressure sensor in accordance with the present invention, since the epitaxial layer 16 which is of a conductivity type opposite to that of the layer to be etched acts as an etching stopper, it is possible to obtain a pressure sensor having a diaphragm which is highly accurate in film thickness and is free of surface roughness due to etching. In addition, since the crystal direction of the p-type silicon substrate 14 is inclined by a predetermined angle with respect to the <111> axes, and the crystal direction of the n-type epitaxial layer 16 coincides with the same, the formability of the n-type epitaxial layer 16 is excellent. Since those side walls of the cavity 200 in the silicon substrate 14 that are respectively arranged along the longitudinal direction of the diaphragm 18 formed during etching constitute the {111} faces, i.e., since the side walls of the silicon substrate 14 are each formed at an angle of 90° with respect to the thicknesswise lower surface of the n-type epitaxial layer 16, the dimensional accuracy of the diaphragm itself for the pressure sensor is high, and the pressure sensor can be made ultra-compact.

Although, in the above-described embodiment, the silicon substrate is set to be a p-type, and the epitaxial layer an n-type, the pressure sensor in accordance with the present invention suffices if the substrate and the epitaxial layer are of opposite conductivity. Namely, it goes without saying that similar advantages are obtained if the silicon substrate is set to be the n-type, and the epitaxial layer the p-type.

The above-described pressure can be manufactured by the following method.

The crystal face of the silicon substrate 14 whose crystallographic axes are the <110> axes are inclined by a predetermined angle about the <111> axes to cause that crystallographic axes to coincide with the normal axis 100. In this state, the step of forming a conductive-type epitaxial layer is started. Namely, the epitaxial layer 16 of a conductivity type opposite to that of the silicon substrate 14 is grown on the silicon substrate 14. As for the formation of the epitaxial layer 16, it is possible to use a known method, such as vapor-phase epitaxy. The epitaxial layer 16 of the silicon wafer thus obtained is subjected to predetermined diffusion treatment to form the gage resistors, i.e., diffusion gages 20. Then, a portion of the silicon substrate 14 corresponding to that portion of the surface of the n-type epitaxial layer 16 which is opposite to the portion of the surface thereof where the diffusion gages 20 are provided is subjected to etching by using the conductive-type epitaxial layer 16 as an etching stopper to form the cavity 200, thereby forming the diaphragm 18. If electrochemical etching is carried out as an etching method, etching stops at the interface between the silicon substrate 14 and the epitaxial layer 16, so that only one etching process is required, and a diaphragm which has excellent dimensional accuracy and is free of surface roughness due to etching is formed. The pressure sensor is thus manufactured.

What is claimed is:

1. A pressure sensor comprising:

a semiconductor silicon single-crystal substrate which has a fixed thickness and whose crystallographic axes are inclined by a predetermined angle with respect to a normal to a thicknesswise face of said semiconductor silicon single-crystal substrate;

a conductive-type epitaxial layer which is of a conductivity type opposite to that of said semiconductor silicon single-crystal substrate and is grown on said semiconductor silicon single-crystal substrate to a predetermined thickness such that a direction of a crystallographic axes of said conductive-type epitaxial layer coincides with a direction of the crystallographic axes of said semiconductor silicon single-crystal substrate; and gage resistors formed by means of diffusion treatment on a first surface of said conductive-type epitaxial layer opposite to a second surface thereof abutting said semiconductor silicon single-crystal substrate, wherein said semiconductor silicon single-crystal substrate is formed with a portion thereof being removed by etching to form a cavity, said portion corresponding to that planar range of said conductive-type epitaxial layer that includes a portion where said gage resistors are formed.

2. A pressure sensor according to claim 1, wherein an angle formed by the crystallographic axes of said semiconductor silicon single-crystal substrate and the normal to the thicknesswise face thereof is not less than 1° and not more than 5°.

3. A pressure sensor according to claim 1, wherein a type of conductivity of said semiconductor silicon single-crystal substrate is one of a p-type and an n-type.

4. A pressure sensor according to claim 3, wherein a type of conductivity of said conductive-type epitaxial layer is the other of the p-type and the n-type.

5. A pressure sensor according to claim 1, wherein the growth of said conductive-type epitaxial layer is effected by vapor-phase epitaxy.

6. A pressure sensor according to claim 1, wherein side surfaces of the cavity formed in said semiconductor silicon single-crystal substrate after removal by etching are provided in such a manner as to be perpendicular to a longitudinal direction of said conductive-type epitaxial layer.

7. A pressure sensor according to claim 1, wherein side surfaces of the cavity formed in said semiconductor silicon single-crystal substrate after removal by etching are provided so as to constitute {111} faces of said semiconductor silicon single-crystal substrate.

8. A pressure sensor according to claim 1, wherein said conductive-type epitaxial layer acts as an etching stopper when the portion of said semiconductor silicon single-crystal substrate corresponding to said range is removed by etching.

9. A method of manufacturing a pressure sensor, comprising the steps of:

inclining a semiconductor silicon single-crystal substrate which has a fixed thickness and whose crystallographic axes are inclined by a predetermined angle with respect to a normal to a thicknesswise face of said semiconductor silicon single-crystal substrate, said semiconductor silicon single-crystal substrate being inclined by said predetermined angle in such a manner as to cause that crystallographic axes to coincide with a normal axis thereof;

growing, on a surface of said semiconductor silicon single-crystal substrate, a conductive-type epitaxial layer of a conductivity type opposite to that of said semiconductor silicon single-crystal substrate to a predetermined thickness in a state in which said semiconductor silicon single-crystal substrate is inclined by said predetermined angle;

forming gage resistors by means of diffusion treatment on a first surface of said conductive-type epitaxial layer opposite to a second surface thereof abutting said semiconductor silicon single-crystal substrate; and removing as an etching step a portion of said semiconductor silicon single-crystal substrate by etching to form a cavity, said portion corresponding to that planar range of said conductive-type epitaxial layer that includes a portion where said gage resistors are formed.

10. A method of manufacturing a pressure sensor according to claim 9, wherein said etching step is effected by anisotropic etching.

11. A method of manufacturing a pressure sensor according to claim 10, wherein said anisotropic etching is electrochemical etching.

12. A method of manufacturing a pressure sensor according to claim 11, wherein in said etching step said conductive-type epitaxial layer acts as an etching stopper when the portion of said semiconductor silicon single-crystal substrate is removed by etching.

13. A method of manufacturing a pressure sensor according to claim 9, wherein said step of growing the epitaxial layer is effected by vapor-phase etching.

14. A method of manufacturing a pressure sensor according to claim 9, wherein in said inclining step the crystallographic axes of said semiconductor silicon single-crystal substrate is inclined by not less than 1° and not more than 5°.

15. A pressure sensor according to claim 9, wherein said etching step is effected such that side surfaces of the cavity formed in said semiconductor silicon single-crystal substrate after removal by etching are provided in such a manner as to be perpendicular to a longitudinal direction of said conductive-type epitaxial layer.

16. A pressure sensor according to claim 9, wherein said etching step is effected such that side surfaces of the cavity formed in said semiconductor silicon single-crystal substrate after removal by etching are provided so as to constitute {111} faces of said semiconductor silicon single-crystal substrate.

17. A method of manufacturing a pressure sensor, comprising the steps of:

inclining a semiconductor silicon single-crystal substrate which has a fixed thickness and whose crystallographic axes are inclined by a predetermined angle with respect to a normal to a thicknesswise face of said semiconductor silicon single-crystal substrate, said semiconductor silicon single-crystal substrate being inclined by said predetermined angle in such a manner as to cause that crystallographic axes to coincide with a normal axis thereof;

growing, on a surface of said semiconductor silicon single-crystal substrate, a conductive-type epitaxial layer of a conductivity type opposite to that of said semiconductor silicon single-crystal substrate to a predetermined thickness by vapor-phase epitaxy in a state in which said semiconductor silicon single-crystal substrate is inclined by said predetermined angle;

forming gage resistors by means of diffusion treatment on a first surface of said conductive-type epitaxial layer opposite to a second surface thereof abutting said semiconductor silicon single-crystal substrate; and removing as an etching step a portion of said semiconductor silicon single-crystal substrate by electrochemical etching to form a cavity by allowing said conductive-type epitaxial layer to act as an etching stopper, said portion corresponding to that planar range of said conductive-type epitaxial layer that includes a portion where said gage resistors are formed.

18. A method of manufacturing a pressure sensor according to claim 17, wherein in said inclining step the crystallographic axes of said semiconductor silicon single-crystal substrate is inclined by not less than 1° and not more than 5°.

19. A pressure sensor according to claim 17, wherein said etching step is effected such that side surfaces of the cavity formed in said semiconductor silicon single-crystal substrate after removal by etching are provided in such a manner as to be perpendicular to a longitudinal direction of said conductive-type epitaxial layer.

20. A pressure sensor according to claim 17, wherein said etching step is effected such that side surfaces of the cavity formed in said semiconductor silicon single-crystal substrate after removal by etching are provided so as to constitute {111} faces of said semiconductor silicon single-crystal substrate.

* * * * *